United States Patent [19]

Schultheis

[11] 4,109,193
[45] Aug. 22, 1978

[54] SELF-CONTAINED VEHICLE BATTERY CHARGER

[75] Inventor: James R. Schultheis, Dade County, Fla.

[73] Assignee: Timco Engineering, Inc., Miami, Fla.

[21] Appl. No.: 756,133

[22] Filed: Jan. 3, 1977

[51] Int. Cl.² .............................................. H02J 7/00
[52] U.S. Cl. ...................................... 320/2; 320/48; 320/51
[58] Field of Search ...................... 320/2-4, 320/25, 48, 51, 57, 23

[56] References Cited

U.S. PATENT DOCUMENTS

| | | | |
|---|---|---|---|
| 2,000,571 | 5/1935 | Oswald | 320/51 X |
| 3,349,310 | 10/1967 | Ladoniczki | 320/25 |
| 3,371,302 | 2/1968 | Mas | 320/57 X |
| 3,696,283 | 10/1972 | Ackley | 320/2 |
| 3,728,608 | 4/1973 | Teich | 320/23 |
| 3,970,913 | 6/1976 | Heindl | 320/48 |
| 3,974,441 | 8/1976 | Van Den Haak | 320/48 X |

*Primary Examiner*—Robert J. Hickey
*Attorney, Agent, or Firm*—Oltman and Flynn

[57] ABSTRACT

The present unit has a dielectric housing with metal prongs or blades for plug-in insertion into a conventional A.C. power socket, a step-down transformer and a rectifier in the housing, a closely coiled power cord extending from the housing, and a plug at the opposite end of the power cord for plug-in insertion into the usual cigarette lighter socket in a car. A selector switch, either in the housing or the plug, selects the charging rate. An LED or a meter is provided in the plug to indicate visually when the car battery is being charged.

12 Claims, 4 Drawing Figures

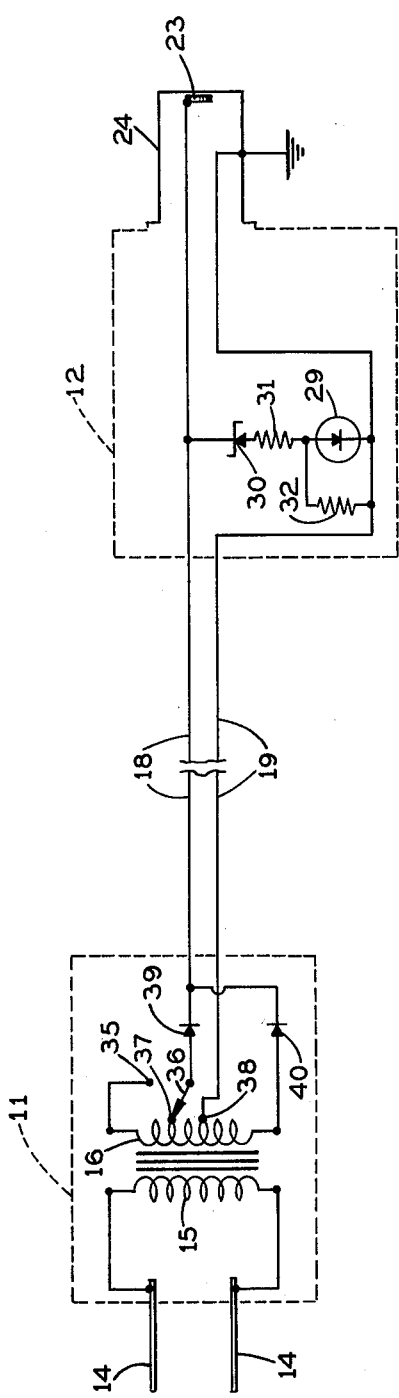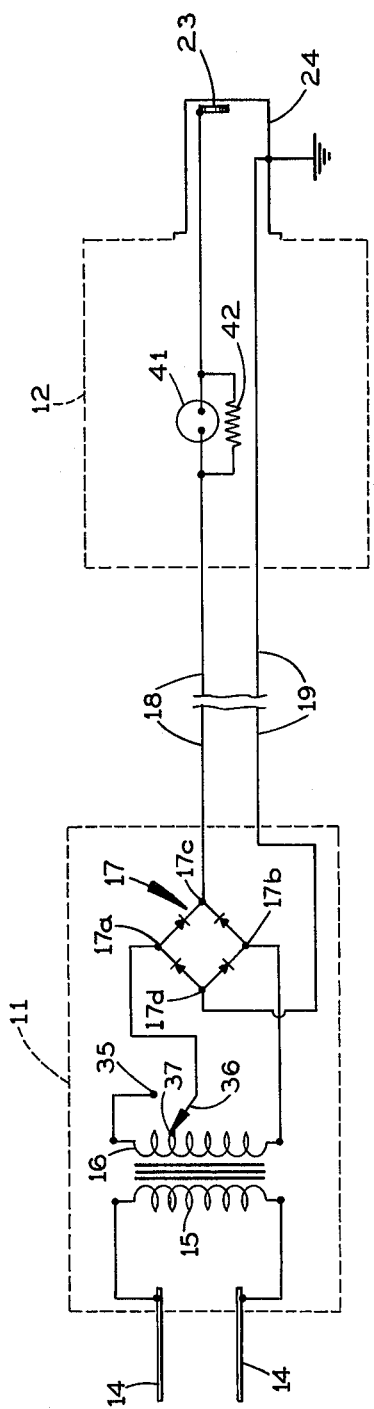
FIG. 3
FIG. 4

SELF-CONTAINED VEHICLE BATTERY CHARGER

BACKGROUND OF THE INVENTION

The broad concept of charging a car battery through the cigarette lighter socket on the car is disclosed in U.S. Pat. No. 2,979,607. This patent is directed to a special purpose installation in an outdoor theater in which the car's loudspeaker will be connected to broadcast the movie's sound track. At the same time, the car battery may be trickle-charged through a wire plugged into the lighter socket.

SUMMARY OF THE INVENTION

This invention is directed to a portable, small, self-contained unit for charging a car battery through the usual cigarette lighter socket on the car from a standard A.C. power socket external to the car. The A.C. power socket may be the usual 110–120 volt A.C. wall socket in the car owner's garage, for example, or at a service station.

Preferably, the present unit comprises:

(1) a small dielectric housing with a pair of metal prongs or blades projecting from it for snug reception in a standard A.C. power socket, and inside this housing a step-down transformer having its primary connected across these prongs or blades and having its secondary connected to a semiconductor rectifier in the housing;

(2) a closely helically wound, insulated power cord physically connected at one end to the housing and connected electrically there to the output of the rectifier; and (3) a plug at the opposite end of the power cord slidably insertable into the cigarette lighter socket on the car.

The unit also may have a light-emitting diode or a meter in the lighter socket plug to indicate the charging condition. Also, a switch may be provided in the lighter socket plug or in the housing for the step-down transformer and rectifier for the purpose of switching between full and trickle charging rates.

A principal object of this invention is to provide a novel and improved, portable, small, self-contained vehicle battery charger which is adapted for direct plug-in mounting at one end on a standard A.C. power socket and has a plug at the opposite end for slidable insertion in the usual cigarette lighter socket on the car, so that the car battery can be charged through the cigarette lighter socket.

Further objects and advantages of this invention will be apparent from the following detailed description of three presently-preferred embodiments thereof, which are shown in the accompanying drawings in which:

FIG. 3 is a schematic diagram of the electrical circuit of this unit in accordance with a second embodiment of the invention; and FIG. 4 is a schematic diagram of the electrical circuit of this unit in accordance with a third embodiment of the invention.

Figures 1, 2:
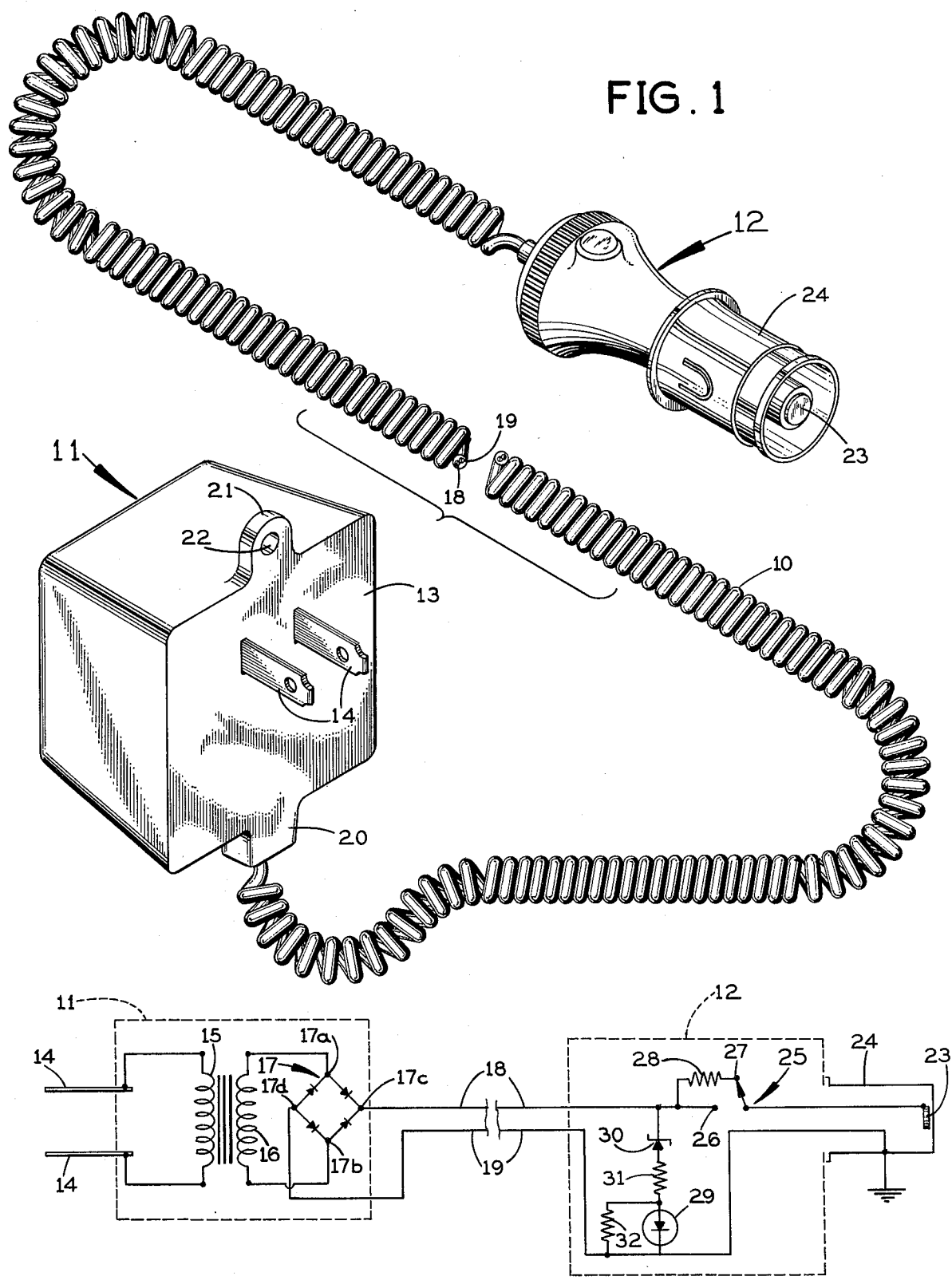
FIG. 1 is a perspective view of one embodiment of the present unit, with the power cord broken at the middle to conserve space in the drawings.
FIG. 2 is a schematic diagram of the electrical circuit of this unit in accordance with a first embodiment of the invention.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Referring first to FIG. 1, the present apparatus comprises a closely helically-wound, two-wire, insulated power cord 10 connected at one end to a dielectric housing 11 and at the opposite end to a plug 12 adapted for slidable insertion into a cigarette lighter socket of conventional design, usually found on the dashboard of an automotive vehicle, such as a passenger car. The power cord is easily extended in length, simply by exerting a slight pull on it, but its inherent resiliency restores it to the minimum length dictated by the spacing between housing 11 and plug 12 when they are plugged into the respective sockets.

The housing 11 may be of any suitably rigid and strong plastic material. It presents a flat end face 13 from which a pair of metal prongs or blades 14 project perpendicularly. These prongs or blades are snugly insertable into the usual pair of openings in a 110–120 volt A.C. wall socket to connect the A.C. power source across these prongs or blades.

As shown schematically in FIG. 2, the housing 11 encloses a step-down transformer whose primary winding 15 is connected across the prongs or blades 14. The transformer has a secondary winding 16, the opposite ends of which are connected to the input terminals 17a and 17b of a full-wave semiconductor rectifier 17 of conventional design. The output terminals 17c and 17d of this rectifier are connected respectively to the two electrically conductive wires 18 and 19 in the power cord 10 at one end of the latter. These wires are embedded in and separated by the usual insulation in the power cord 10 along its entire length between the housing 11 and the plug 12. The rectifier 17 is enclosed within the housing 11.

This end of the power cord 10 is physically anchored to the housing 11 in a known manner so that they cannot become separated under normal conditions of use. As shown in FIG. 1, the power cord 10 enters the housing 11 at a downwardly projecting boss 20 on the bottom of the housing at its flat end face 13 where the metal prongs or blades 14 are located.

At this same end face 13 the dielectric housing 11 has an upwardly projecting boss 21 at the top with a horizontal opening 22 for passing a screw (not shown) by which this housing may be attached to the A.C. power socket, if desired.

The plug 12 at the opposite end of the power cord 10 has a central terminal 23 on its inner end for engaging the ungrounded terminal of the cigarette lighter socket on the car. This terminal of the lighter socket is connected to the ungrounded terminal of the car battery.

The plug 12 also has a conductive outer shell 24 which is grounded to the car chassis through the cigarette lighter socket when the plug is inserted into this socket.

In this embodiment, a selector switch 25 is provided in the plug 12 for selecting either a full charge rate or a trickle charge rate. The mobile contact of switch 25 is selectively engageable with either:

(1) a first fixed contact 26 connected directly to wire 18 in the power cord; or (2) a second fixed contact 27 connected to wire 18 through a current limiting resistor 28, which reduces the charging current to a trickle charge rate.

The selector switch 25 has a knob or other manually-operated actuator on the outside of the plug 12, enabling the mobile contact of the switch to be adjusted between the trickle charge position shown in FIG. 2 and the full charge position in which it engages the fixed contact 26.

A light-emitting semiconductor diode 29 is mounted on the plug 12 to be visible from the outside of the plug, as shown in FIG. 1. The LED is connected across the wires 18 and 19 of the power cord 10 in series with a Zener diode 30 and a resistor 31. A resistor 32 is connected across LED 29 between the lower end of the resistor 31 in FIG. 2 and the wire 19 of the power cord 10 which leads to the plug terminal 24 which engages the grounded terminal of the lighter socket.

The LED 29 is illuminated whenever the prongs 14 are plugged into the A.C. power socket but the car battery is not connected across the terminals 23 and 24 of the plug 12. Due to the Zener diode 30, the LED goes off abruptly when the plug 12 is inserted into the cigarette lighter socket to connect the car battery across its terminals 23, 24 while the prongs 14 are plugged into the A.C. power socket.

In the alternative arrangement shown schematically in FIG. 3, the switch 25 and resistor 28 are omitted from the plug 12, and the LED 29, Zener diode 30 and resistors 31 and 32 are included in the plug, as in the FIG. 2 embodiment. The secondary winding 16 of the transformer in the housing 11 has its upper end in FIG. 3 connected directly to one fixed contact 35 of a manually operated selector switch having a mobile contact 36. This selector switch has a second fixed contact 37 at an intermediate position on the transformer secondary 16 between its upper end and its midpoint 38. The mobile contact 36 of the selector switch is operated by a knob or other actuator located at the outside of the housing 11, and this mobile contact is selectively engageable with either the fixed contact 35 or the fixed contact 37.

Within the housing 11 the rectifier comprises a first semiconductor rectifier diode 39, connected between the mobile contact 36 of the selector switch and the adjacent end of wire 18 of the power cord 10, and a second semiconductor rectifier diode 40, connected between the lower end of the transformer secondary winding 16 and this end of wire 18. Wire 19 of the power cord 10 is connected directly to the midpoint 38 of the transformer secondary winding 16.

With this arrangement, when the mobile contact 36 of the selector switch is connected to the first fixed contact 35, full charging current is supplied to the plug 12. When the mobile contact 36 of the selector switch is connected to the second fixed contact 37, a reduced, trickle charge current is supplied to the plug.

FIG. 4 shows a third embodiment in which the selector switch 35, 36, 37 in the housing 11 is connected to the transformer secondary winding 16 in the same manner as in FIG. 3. A full wave semiconductor rectifier 17 has its input terminal 17a connected to the mobile contact 36 of the selector switch and its opposite input terminal 17b connected to the lower end of the transformer secondary winding 16 in FIG. 4. The opposite output terminals 17c and 17d of the rectifier 17 are respectively connected directly to the wires 18 and 19 of the power cord 10.

A charge meter 41, shunted by a resistor 42, is located in the plug 12 at the opposite end of the power cord. This charge meter may be either an ammeter or a voltmeter, and it is connected between the wire 18 of the power cord and the plug terminal 23 which will contact the ungrounded terminal of the lighter socket. The other wire 19 of the power cord is connected directly to the other plug terminal 24.

Obviously, the meter 41 will show a charging current only when the plug 12 is plugged into the cigarette lighter socket on the car and the car battery is receving a charge through plug 12.

The present battery charger is small enough to fit in the glove or map compartment of a car. All that it requires, in order to be put into operation, is the ubiquitous, standard A.C. wall socket, on which the housing 11 for the transformer and rectifier may be mounted directly by the metal prongs or blades 14. Since the battery will be charged through the cigarette lighter socket, it is not necessary even to open the hood for access to the engine compartment and apply clips to the battery terminals. Instead, all that is required is to insert the plug into the cigarette lighter socket. The charging rate can be selected by means of the selector switch in the present unit, which may be located either in the housing for the transformer and rectifier or in the plug for the cigarette lighter socket. A visual indication of the charging condition is provided by the LED or the meter in this plug. The power cord 10 is readily extensible in length, but only to the extent needed since it normally assumes the shortest permissible overall length. Accordingly, the present unit is extremely compact and convenient to use.

I claim:

1. Apparatus for charging from an A.C. power socket the battery on an automotive vehicle having a cigarette lighter socket with a pair of electrical terminals connected respectively to the ungrounded and grounded terminals of the vehicle battery, said apparatus comprising:

an electrical plug which is manually insertable and removable into and out of the cigarette lighter socket on the vehicle, said plug being complementary to the lighter socket and having electrical terminals which respectively engage the ungrounded and grounded terminals of the lighter socket when the plug is inserted therein;

an insulated power cord having a pair of electrically conductive wires therein connected at one end to the terminals of said plug;

a housing located at the opposite end of the power cord and having a pair of electrically-conductive prongs projecting therefrom for insertion in the A.C. power socket to physically mount said housing directly on the power socket;

a step-down transformer in said housing having its input connected across said prongs and its output operatively connected to the wires of the power cord;

a rectifier having its input operatively connected across the output of said transformer to rectify the step-down voltage output of the transformer, said rectifier having its output operatively connected to the terminals of said plug for supplying the rectified step-down voltage thereto;

and a manually operable selector switch operatively connected between the output of said rectifier and said plug for selectively determining the charging rate, said selector switch being in said plug and comprising a first fixed contact connected conductively to the output of said rectifier, a second fixed contact, current limiting resistor means connected between said second fixed contact and said conductive connection to the output of said rectifier, and a mobile contact connected to the plug terminal which is engageable with the ungrounded terminal of the lighter socket and selectively engageable either with said first fixed contact to supply full charging current to the plug or with said second fixed contact to supply a trickle charge current to the plug.

2. An apparatus according to claim 1, and further comprising a light emitting semiconductor diode in said plug which means visible at the outside of the plug and is operatively connecting said diode across the plug terminals:
   (a) to be illuminated when the car battery is not connected across the plug terminals and said prongs on the housing are inserted into the A.C. power socket;
   (b) to go off when the car battery is connected across the plug terminals and said prongs on the housing are inserted into the A.C. power socket.

3. Apparatus for charging from an A.C. power socket the battery on an automotive vehicle having a cigarette lighter socket with a pair of electrical terminals connected respectively to the ungrounded and grounded terminals of the vehicle battery, said apparatus comprising:
   an electrical plug which is manually insertable and removable into and out of the cigarette lighter socket on the vehicle, said plug being complementary to the lighter socket and having electrical terminals which respectively engage the ungrounded and grounded terminals of the lighter socket when the plug is inserted therein;
   an insulated power cord having a pair of electrically conductive wires therein connected at one end to the terminals of said plug;
   a housing located at the opposite end of the power cord and having a pair of electrically-conductive prongs projecting therefrom for insertion in the A.C. power socket to physically mount said housing directly on the power socket;
   a step-down transformer in said housing having its input connected across said prongs and its output operatively connected to the wires of the power cord, said transformer having a secondary winding with its midpoint connected directly to the wire of the power cord leading to the plug terminal which engages the grounded terminal of the lighter socket;
   a rectifier operatively connected across the output of said transformer to rectify the step-down voltage output of the transformer, said rectifier being operatively connected to the terminals of said plug for supplying the rectified step-down voltage thereto;
   a manually operable selector switch in said housing connected electrically between the output of said transformer and said rectifier for selectively determining the charging rate, said selector switch comprising a first fixed contact connected directly to one end of said secondary winding, a second fixed contact connected to said secondary winding between said one end and its midpoint, and a mobile contact connected to said rectifier and selectively engageable either with said first fixed contact to supply full charging current to the plug or with said second fixed contact to supply a reduced trickle charge current to the plug;
   and a light emitting semiconductor diode in said plug which is visible at the outside of the plug and means operatively connecting said diode across the plug terminals
   (a) to be illuminated when the car battery is not connected across the plug terminals and said prongs on the housing are inserted into the A.C. power socket;
   (b) to go off when the car battery is connected across the plug terminals and said prongs on the housing are inserted into the A.C. power socket.

4. Apparatus for charging from an A.C. power socket the battery on an automotive vehicle having a cigarette lighter socket with a pair of electrical terminals connected respectively to the ungrounded and grounded terminals of the vehicle battery, said apparatus comprising:
   an electrical plug which is manually insertable and removable into and out of the cigarette lighter socket on the vehicle, said plug being complementary to the lighter socket and having electrical terminals which respectively engage the ungrounded and grounded terminals of the lighter socket when the plug is inserted therein;
   an insulated power cord having a pair of electrically conductive wires therein connected at one end to the terminals of said plug;
   a housing located at the opposite end of the power cord and having a pair of electrically-conductive prongs projecting therefrom for insertion in the A.C. power socket to physically mount said housing directly on the power socket;
   a step-down transformer in said housing having its input connected across said prongs and its output operatively connected to the wires of the power cord;
   a rectifier operatively connected across the output of said transformer to rectify the step-down voltage output of the transformer, said rectifier being operatively connected to the terminals of said plug for supplying the rectified step-down voltage thereto;
   a manually operable selector switch in said housing connected electrically between the output of said transformer and said rectifier for selectively determining the charging rate, said selector switch comprising a first fixed contact connected directly to one end of said secondary winding, a second fixed contact connected to said secondary winding between said one end and its midpoint, and a mobile contact connected to said rectifier and selectively engageable either with said first fixed contact to supply full charging current to the plug or with said second fixed contact to supply a reduced trickle charge current to the plug;
   and a meter in said plug connected to one of said wires of the power cord for indicating the charging rate, said meter being visible from the outside of the plug.

5. Apparatus for charging from an A.C. power socket the battery on an automotive vehicle having a cigarette lighter socket with a pair of electrical terminals connected respectively to the ungrounded and grounded terminals of the vehicle battery, said apparatus comprising:
   an electrical plug which is manually insertable and removable into and out of the cigarette lighter socket on the vehicle, said plug being complementary to the lighter socket and having electrical terminals which respectively engage the ungrounded and grounded terminals of the lighter socket when the plug is inserted therein;

an insulated power cord having a pair of electrically conductive wires therein connected at one end to the terminals of said plug;

a housing located at the opposite end of the power cord and having a pair of electrically-conductive prongs projecting therefrom for insertion in the A.C. power socket to physically mount said housing directly on the power socket;

a step-down transformer in said housing having its input connected across said prongs and its output operatively connected to the wires of the power cord;

a rectifier operatively connected across the output of said transformer to rectify the step-down voltage output of the transformer, said rectifier being operatively connected to the terminals of said plug for supplying the rectified step-down voltage thereto;

and a light emitting semiconductor diode in said plug which is visible at the outside of the plug and means operatively connecting said diode across the plug terminals (a) to be illuminated when the car battery is not connected across the plug terminals and said prongs on housing are inserted into the A.C. power socket;

(b) to go off when the car battery is connected across the plug terminals and said prongs on the housing are inserted into the A.C. power socket.

6. An apparatus according to claim 5, and further comprising:

a manually operable selector switch in said plug connected between one wire of said power cord and the plug terminal which is engageable with the ungrounded terminal of the lighter socket for selecively determining the charging rate;

and wherein said light emitting diode is connected across the wires of the power cord ahead of said selector switch.

7. Apparatus according to claim 6, wherein said selector switch has a first fixed contact connected directly to said one wire of the power cord, a second fixed contact, current limiting resistor means connected between said second fixed contact and said one wire of the power cord, and a mobile contact connected to said last-mentioned plug terminal and selectively engageable either with said first fixed contact to supply full charging current to the plug or with said second fixed contact to supply a reduced trickle charge current to the plug.

8. Apparatus according to claim 5, wherein:

said transformer has a secondary winding with its midpoint connected directly to the wire of the power cord leading to the plug terminal which engages the grounded terminal of the lighter socket;

and said selector switch is in said housing and comprises a first fixed contact connected directly to one end of said secondary winding, a second fixed contact connected to said secondary winding between said one end and its midpoint, and a mobile contact connected to said rectifier and selectively engageable either with said first fixed contact to supply full charging current to the plug or with said second fixed contact to supply a reduced trickle charge current to the plug.

9. Apparatus according to claim 5, and further comprising:

a Zener diode and a resistor connected in series with said light emitting diode across the wires of the power cord;

and a resistor connected in parallel with said light emitting diode.

10. Apparatus according to claim 6, and further comprising:

a Zener diode and a resistor connected in series with said light emitting diode across the wires of the power cord;

and a resistor connected in parallel with said light emitting diode.

11. Apparatus for charging from an A.C. power socket the battery on an automotive vehicle having a cigarette lighter socket with a pair of electrical terminals connected respectively to the ungrounded and grounded terminals of the vehicle battery, said apparatus comprising:

an electrical plug which is manually insertable and removable into and out of the cigarette lighter socket on the vehicle, said plug being complementary to the lighter socket and having electrical terminals which respectively engage the ungrounded and grounded terminals of the lighter socket when the plug is inserted therein;

an insulated power cord having a pair of electrically conductive wires therein connected at one end to the terminals of said plug;

a housing located at the opposite end of the power cord and having a pair of electrically conductive prongs projecting therefrom for insertion in the A.C. power socket to physically mount said housing directly on the power socket;

a step-down transformer in said housing having its input connected across said prongs and its output operatively connected to the wires of the power cord;

a rectifier operatively connected across the output of said transformer to rectify the step-down voltage output of the transformer, said rectifier being operatively connected to the terminals of said plug for supplying the rectified step-down voltage thereto;

and a meter in said plug connected to one of said wires of the power cord for indicating the charging rate, said meter being visible from the outside of the plug.

12. Apparatus according to claim 11, wherein:

said transformer has a secondary winding with its midpoint connected directly to the wire of the power cord leading to the plug terminal which is engageable with the grounded terminal of the lighter socket;

and said selector switch is in said housing and comprises a first fixed contact connected directly to one end of said secondary winding, a second fixed contact connected to said secondary winding between said one end and its midpoint, and a mobile contact connected to said rectifier and selectively engageable either with said first fixed contact to supply full charging current to the plug or with said second fixed contact to supply a reduced trickle charge current to the plug.

* * * * *